TWO STAGE COMMINUTOR

Original Filed Aug. 12, 1960 3 Sheets-Sheet 1

Inventors
Siegfried Stephan
Fritz Otto
By Michael S. Striker
Attorney

TWO STAGE COMMINUTOR

Original Filed Aug. 12, 1960 3 Sheets-Sheet 2

Inventors
Siegfried Stephan
Fritz Otto
BY Michael S. Striker
Attorney

TWO STAGE COMMINUTOR

Original Filed Aug. 12, 1960 3 Sheets-Sheet 3

Inventors
Siegfried Stephan
Fritz Otto
By Michael S. Striker
Attorney

United States Patent Office

Re. 27,002
Reissued Dec. 15, 1970

27,002
TWO STAGE COMMINUTOR

Siegfried Stephan and Fritz Otto, Hameln (Weser), Germany, assignors, by mesne assignments, to Belder Trust Reg., Vaduz, Liechtenstein Original No. 3,313,332, dated Apr. 11, 1967, Ser. No. 359,543, Apr. 7, 1964, which is a continuation of Ser. No. 49,278, Aug. 12, 1960. Application for reissue Aug. 30, 1968, Ser. No. 756,693
Claims priority, application Germany, Aug. 12, 1959, St 15,455
Int. Cl. B02c *18/12*
U.S. Cl. 146—192 11 Claims

Matter enclosed in heavy brackets [ ] appears in the original patent but forms no part of this reissue specification; matter printed in italics indicates the additions made by reissue.

*ABSTRACT OF THE DISCLOSURE*

*A comminutor comprising a pre-comminutor and a fine-comminutor located subsequent to said pre-comminutor in the direction of material flow, an apertured plate between the comminutors with means to vary the size openings therein or to completely close the openings, and mixing means in the pre-comminutor.*

The present invention relates to comminuting devices, particularly of the type which comminute meat and similar materials.

The present application is a continuation application of the copending application filed Aug. 12, 1960, with the Ser. No. 49,278, now abandoned.

At the present time comminuting devices of this type cannot provide a comminuted material of desired fineness and uniformity in a single operation. Thus, unless the material is passed through the comminuting device a plurality of times then the material which is received from the device will have a section of meat followed by a section of fat, for example in the same sequence that these different ingredients are supplied to the comminuting device.

One of the objects of the present invention is to provide a comminuting device which in a single operation will guarantee that the material received from the comminuting device will have uniform properties with respect to the uniform distribution of the ingredients throughout the comminuted material and at the same time will have the desired fineness.

Another object of the present invention is to provide a comminuting device in which only material of a predetermined degree of fineness will reach a fine comminuting means which is subsequent to a pre-comminuting means of the device.

It is also an object of the present invention to provide a structure in which none of the parts will become clogged or otherwise stopped up and in which all of the elements will operate reliably and will handle the material supplied in an efficient manner.

With the above objects in view the invention includes, in a comminuting device for material such as meat or the like, a pre-comminuting means and a fine comminuting means located subsequent to the pre-comminuting means in the direction of material flow, and an apertured plate located between and separating the pre-comminuting means and the fine comminuting means from each other. This apertured plate is provided with apertures whose size determines the fineness of the material which reaches the fine comminuting means. Associated with the pre-comminuting means is a mixer, and the material treated by the pre-comminuting means as well as the mixing means is thoroughly comminuted and mixed to the degree of fineness determined by the apertures of the separating plate before this material reaches the fine comminuting means so that the latter comminutes the material to the desired degree of fineness and delivers it in a uniform mixture.

The novel features which are considered as characteristic for the invention are set forth in a particular in the appended claims. The invention itself, however, both as to its construction and its method of operation, together with additional objects and advantages thereof, will be best understood from the following description of specific embodiments when read in connection with the accompanying drawings, in which:

Figure 1:
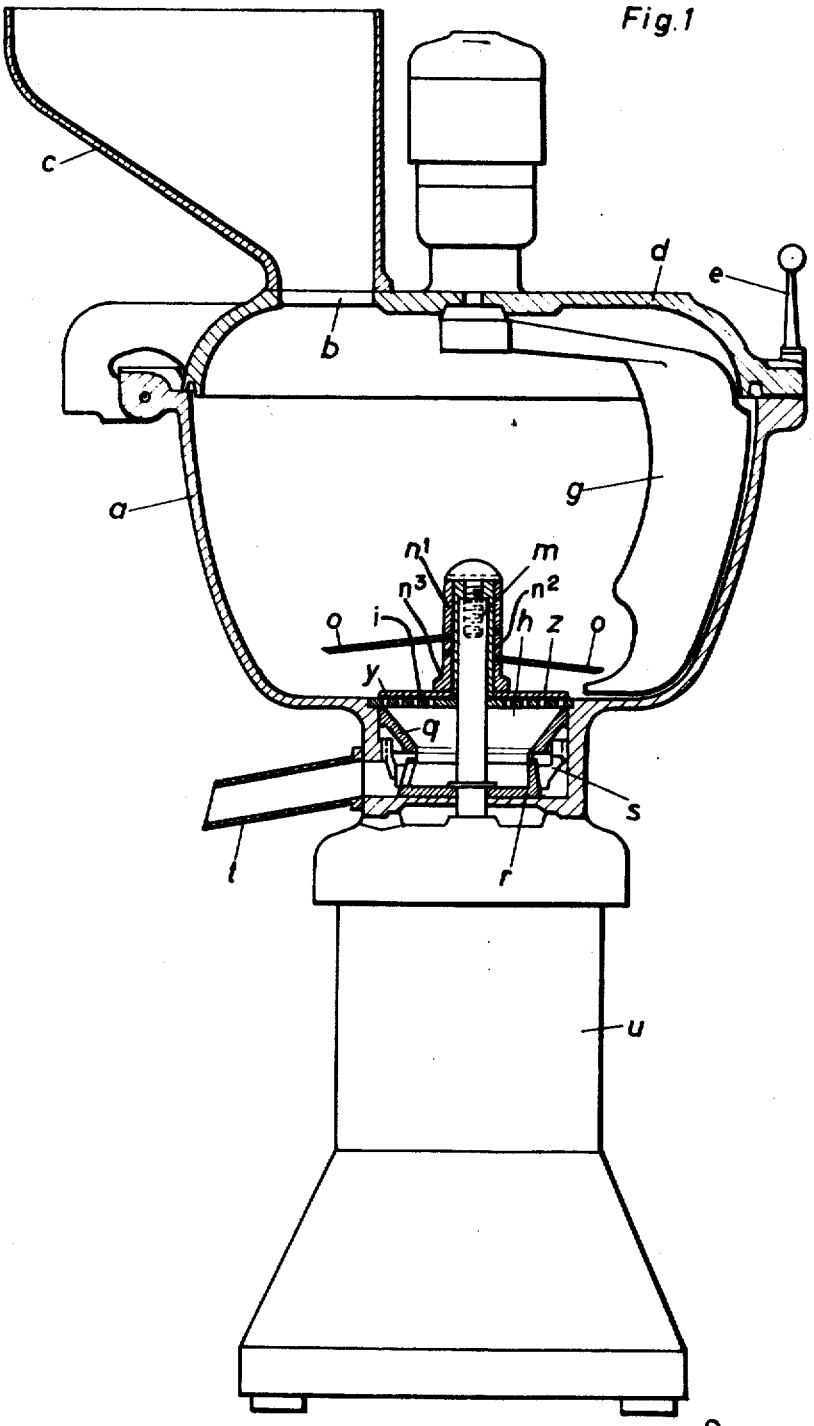
FIG. 1 is an elevation of a comminuting device constructed in accordance with the present invention, the upper part of FIG. 1 being shown in section so as to illustrate the details of the structure of the invention.

Referring now to FIG. 1, the structure illustrated therein includes a pre-comminuting means enclosed within a stationary container a which is provided at its upper end with an inlet opening b through which material is supplied to the interior of the container a to be comminuted therein. The opening b while large enough to allow the material to be freely fed into the interior of container a nevertheless is small to prevent the operator from placing any part of his hand in the interior of the container so that the size of the opening b acts as a safety measure to prevent injury to the operator. The opening b forms part of the upper cover d of the container a, this cover d being turnable to and from the closed position thereof indicated in FIG. 1 left portion of the container a. The cover d permanently carries a supply funnel c which communicates with the inlet opening b in the manner indicated in FIG. 1 so that the operator merely drops the material to be comminuted to the funnel c from where the material flows through the inlet opening b into the container a. A conventional lever e is accessible to the operator for actuating a conventional locking device capable of releasably locking the cover d to the remainder of the container a. Also, the cover d carries a motor d′ which is operatively connected with a rotary mixing vane g which continuously rotates within the stationary container a during operation of the motor carried by the cover d so that the material which is pre-comminuted is also thoroughly mixed. At its lower end the container a is provided with a passage h through which the material can leave the container a.

Figure 2:
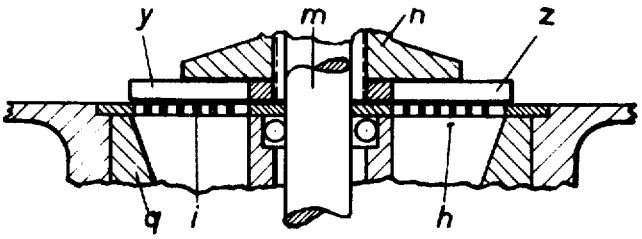
FIG. 2 is a transverse sectional view on an enlarged scale of that part of the device of the invention which is located between the pre-comminuting means and the fine comminuting means.

In accordance with the present invention the container a is provided at its lower end with an upwardly directed annular shoulder surrounding the opening h and serving as a support for an apertured plate i so that this plate i while being maintained in the operating position shown in FIG. 1, as well as in FIG. 2, nevertheless is removable for cleaning purposes simply by being lifted from the shoulder. This apertured plate is formed with a central opening through which a rotary drive shaft m extends with a fairly close fit, this drive shaft m being driven by a motor which forms part of the base u of the device shown in FIG. 1. This arrangement is shown on an enlarged scale in FIGS. 2 and 3. The drive shaft m is keyed to a sleeve which in turn carries three sleeves $n^1$, $n^2$, $n^3$ as indicated in FIG. 1, and these sleeves may be urged downwardly by the head of a screw or the like which is threadedly carried by the upper part of the shaft m for rotary movement therewith. As is evident from FIG. 1, the intermediate sleeve $n^2$ is provided with oppositely inclined end faces, and the upper and lower sleeves $n^1$ and $n^3$ have faces respectively of the same inclination as the oppositely inclined faces of the intermediate sleeve which are located next to the end faces of the upper and lower sleeves. These sleeves $n^1$–$n^3$ may also be keyed to the sleeve which is in turn keyed to the shaft m located between the latter and the sleeves $n^1$–$n^3$. A pair of cutting blades o are respectively clamped between each pair of successive sleeves $n^1$–$n^3$, as illustrated in FIG. 1, and due to the inclination of the blades resulting at least in part from the inclination of the end faces of the sleeves $n^1$–$n^3$, as described above, the blades o in addition to cutting the material in the container a so as to comminute the same act on this material to urge the same downwardly toward the apertured plate i.

The container a is set onto a fine comminuting means carried by the motor u directly beneath the apertured plate i. This fine comminuting means includes the funnel q which feeds the material which passes through the plate i to the cutters of the fine comminuting means, and these cutters include a rotary cutting head r fixed to the common drive shaft m for rotation therewith and a stationary cutting ring s which surrounds the rotary cutting head r and is slidably engaged by the same to provide the desired shearing action for fine comminuting the material received from the pre-comminuting means within the container a. The finely comminuted material finally reaches the discharge tube t, from where it may be collected in any suitable container. The interior of the enclosure formed by the container a and its cover d communicates in the embodiment of FIG. 4 with a nipple or other suitable fitting v which is adapted to be connected with a vacuum pump for the purpose of evacuating the interior of the container a if desired. Also, as is indicated diagrammatically in the upper left portion of FIG. 4, the structure may be provided between the funnel c and the inlet opening b with a slit which is adapted to removably receive a plate w which is diagrammatically indicated in FIG. 4 as capable of being slipped by the operator to and from a position covering the opening b in an air-tight manner so as to close off the interior of the container a from communication with the outer atmosphere through the opening b at the option of the operator. Any suitable manually operable means may be provided to shift the valve plate w from its open position indicated in FIG. 4 to a closed position fluid-tightly closing the opening b. It will be noted that the slit extends only up to the right wall of the funnel c, so that at this right wall the funnel is permanently connected with the cover d. In the same way the apertures of the plate i' are adapted to be closed. Thus, as is indicated most clearly in FIGS. 5 and 6, a rotary closure plate x is located directly beneath the plate i' for free turning movement with respect thereto between the pair of angular positions diagrammatically indicated in FIG. 6, and the exterior wall of the structure which surrounds the fine comminuting means is formed with a slot through which extends a handle which is fixed to the rotary closure plate x so that the latter is capable of being turned by the operator between the pair of positions diagrammatically indicated in FIG. 6, the length of this slot being such that when the handle engages one or the other of the ends of the slot the closure plate x will be located in its closed position or in its open position. As is apparent from FIG. 6 the apertures of the plate i' have a substantially trapezoidal configuration, and the plate x is formed with cutouts of the same configuration and distributed in the same way about the axis of the shaft m, so that when the handle is in the dot-dash line position indicated in FIG. 6 these apertures of the closure plate x will be located out of alignment with the apertured portions of the plate i' so that the latter will be closed and in this way the interior of the container a will be cut off from communication with the outer atmosphere through the discharge opening t. When the handle is shifted to the solid line position indicated in FIG. 6 the openings of the plate x are respectively aligned with the apertured portions of the plate i' so that at this time the material can pass freely from the pre-comminuting means to the fine comminuting means.

The lowermost sleeve $n^3$ serves in the embodiment of FIG. 1 to hold against the upper surface of the apertured plate i a scraper including a pair of blade portions y and z, this scraper being made of resilient material so that the lower sleeve $n^3$ holds the scraper y, z resiliently against the upper face of the apertured plate i which is directed toward the pre-comminuting means. This construction is shown most clearly in FIGS. 2 and 3. As a result of this arrangement the apertures of the plate i will not become stopped and the material will always be able to pass freely through these apertures. The scraper y, z can have its blades integral with a common circular hub through which the shaft m passes, and this hub is formed with a key notch receiving the same key which cooperates with the several sleeves $n^1$–$n^3$ and with the cutting blades o of the pre-comminuting means.

The periphery of the plate i is provided with a projection which extends into a notch of the container a so as to prevent rotary movement of the plate i with respect to the container a, or if desired the container a may be provided with a small projection extending into a notch in the periphery of the plate i to prevent rotary movement of the latter.

Figure 4:
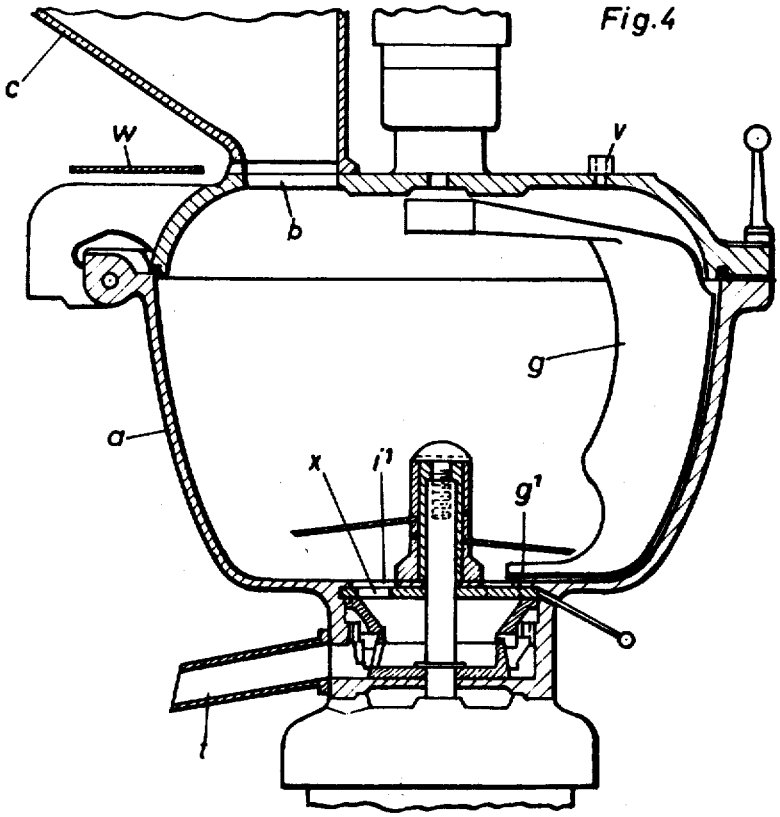
FIG. 4 is a sectional elevation of another embodiment of a comminuting device according to the present invention.

Instead of connecting the scraper y, z to the shaft m for rotary movement with the cutters o, it is also possible to connect the scraper structure to the rotary vane g for rotary movement with the latter. Such a construction is illustrated in FIG. 4 where the rotary vane g has an integral extension g' which extends over the apertured plate i' to act as a scraper with respect to this plate..

The material which is to be comminuted is supplied through the funnel c and the inlet opening b into the interior of the container a. Then in the embodiment of FIG. 4 the valve plates w and x can be moved to their closed positions and the interior of the container a can be evacuated through the connection v. The blades o and the vane g together with its extension g' are set into rotation so that the comminuting of the material takes place within the container a in the evacuated interior thereof.

The material which reaches the comminuting blades o is not only divided up by the action of the blades o but in addition due to the inclined orientation of these blades the material is continuously urged by the cutting blades downwardly toward the apertured plate i'. From here the material moves on the one hand due to the centrifugal force and on the other hand through the force of the subsequent material which is urged downwardly outwardly toward the wall of the container a, and at this wall the material rises up and finally returns back to the blades to be acted again upon by the rotary comminuting blades o. Thus, the material within the container a is circulated in this container and repeatedly acted upon by the blades o while at the same time being mixed by the rotary vane g. As soon as this material has reached a predetermined degree of fineness the plates w and x of FIG. 4 are moved to their open positions and the material will now flow through the apertures of the plate i' to the fine comminuting means. The size of the apertures of the plate i' determines the fineness of the material which reaches the fine comminuting means.

During the circulation of the material in the container a a very effective mixing as well as comminuting thereof takes place so that the several ingredients which are introduced into the container a are formed into a homogenous mixture. As a result of the pre-treatment in the container a, the fine comminuting means can very quickly and easily reduce the material to the desired degree of fineness while further promoting the uniformity of the material, and the material is quickly and easily delivered by the fine comminuting means to the discharge opening t in the form of an outlet tube which delivers material to any desired receiver.

Simultaneously with the pre-comminuting of the material in the container a of FIG. 4, the next charge of material can be placed within the funnel c, so that when the plate w is moved to its open position the material within the funnel c will automatically fall through the inlet opening b into the container a. Thus, not only does the structure of the invention provide a substantially homogenous mixture of the various ingredients comminuted to the desired degree of fineness in a single operation, but in addition the operation is substantially continuous since as soon as the valve plate w of FIG. 4 is moved to its open position a fresh charge reaches the interior of the container a to replace the charge moving out of the latter through the apertured plate i' to the fine comminuting means. The rotary scraper g reliably prevents any stopping of the apertures of the plate i' and at the same time promotes the passage of the material through the apertured plate to the fine comminuting means. Because the apertured plate i' is removable it can be very easily cleaned.

Figure 3:
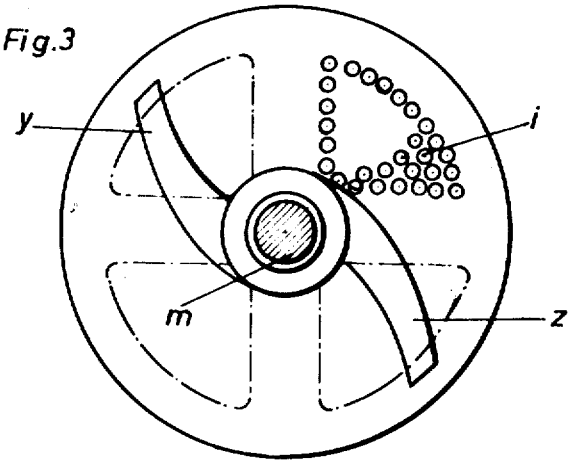
FIG. 3 is a fragmentary plan view of the structure of FIG. 2.
Figure 5:
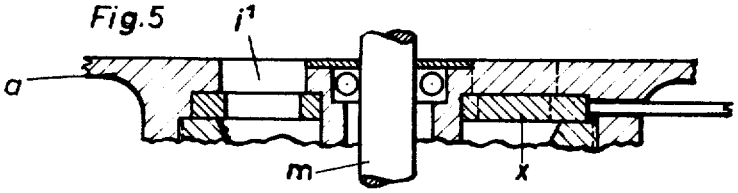
FIG. 5 is a fragmentary transverse section of the structure separating the pre-comminuting and fine comminuting means of FIG. 4 from each other, FIG. 5 illustrating a rotary closure plate capable of closing off communication between the pre-comminuting and fine comminuting means.
Figure 6:
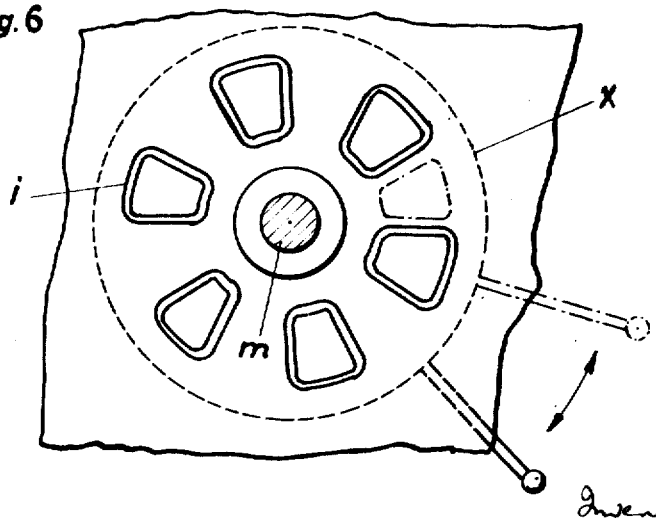
FIG. 6 is a plan view of the structure of FIG. 5.

The embodiment of the invention illustrated in FIGS. 1–3 operates in substantially the same way as the embodiment of FIGS. 4–6. Of course, the interior of the container a of FIG. 1 is not evacuated, and instead of scraper g' the apertured plate i of FIG. 1 is scraped by the scraper y, z. It will be noted that with the embodiment of FIGS. 4–6 as soon as the valve plate x is turned to its open position the pre-comminuted material will readily flow through the relatively large openings of the plate i' into the fine comminuting means. On the other hand, with the embodiment of FIGS. 1–3 the relatively small apertures of the plate i prevent the pre-comminuted material from reaching the fine comminuting means until the fineness of the pre-comminuted material reaches a degree permitting the material to flow through the relatively small apertures of the plate i. Thus, until this degree of fineness is attained the material in the container a will be circulated therein in the manner described above.

Because of the thorough mixing and pre-comminuting of the material in the container a and because the size of the apertures of the plate i prevents material which is too coarse from reaching the fine comminuting means, the desired degree of fineness is provided by the fine comminuting means with only a single passage of the material through the fine comminuting means.

It will be noted that all of the parts can be easily removed for cleaning purposes and can then be easily reassembled. The screw at the upper part of the sleeve which is keyed to the shaft m need only be removed to enable the several sleeves $n^1$–$n^3$ to be removed so that the blades o as well as the scraper y, z can be removed, and thereafter the apertured plate i can be removed. Then the entire container a can be removed, in the embodiment of FIG. 4 with the rotary closure plate x, which can, if desired, have its handle threadly connected thereto so that upon removal of this handle this rotary closure plate x can also be removed and be cleaned, and upon removal of the container a the entire fine comminuting means becomes available for cleaning purposes, and the cutter head r as well as the ring s and the funnel q are also removable and replaceable so that they can be easily and conveniently cleaned.

Figure 7:
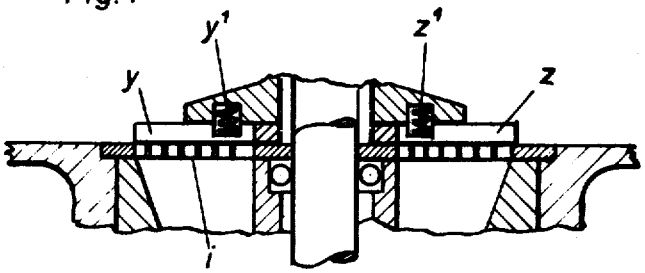
FIG. 7 is a fragmentary transverse section illustrating another embodiment of a structure located in the device of the invention.

FIG. 7 shows an embodiment where the lowermost sleeve and the scraper y, z are formed with pairs of aligned recesses receiving the springs $y_2$ and z' which urge the scraper downwardly against the apertured plate i.

Figure 8:
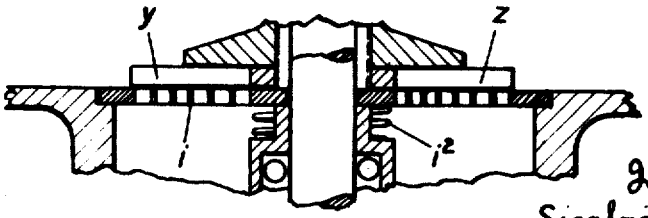
FIG. 8 shows a further embodiment of the structure of FIG. 7.

In FIG. 8 a coil spring $i^2$ is coiled about a portion of a bearing housing through which the shaft m passes, bears against a shoulder of this housing, and also bears against the underside of the plate i to resiliently urge the latter upwardly against the scraper, so that with this embodiment the scraper is also resiliently urged against the apertured plate.

It will be understood that each of the elements described above, or two or more together, may also find a useful application in other types of comminuting devices differing from the types described above.

While the invention has been illustrated and described as embodied in comminuting devices for meat or the like, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a device for comminuting meat or the like, in combination, at least one rotary cutting blade having an outer tip; a container in which said rotary cutting blade is located, said container having an endless side wall spaced a substantial distance from said tip of said blade, the latter comminuting material in said container during rotation of said blade; an apertured plate carried by said container beneath said blade; and mixing and recirculating means in said container for recirculating and mixing material therein during comminuting thereof by said blade, said mixing and recirculating means including a rotary vane extending with a portion thereof between said tip of said blade and said side wall of said container and having a free end portion projecting from said portion radially inwardly in the space between said blade and said plate and having an edge closely adjacent to the latter so that said end portion serves as scraper means cooperating with said plate.

2. In a device for comminuting meat or the like, in combination, pre-comminuting means including at least one rotary cutting blade; fine comminuting means for comminuting with further fineness material received from said pre-comminuting means, said fine comminuting means being located subsequent to said pre-comminuting means along the path of flow of material from said pre-comminuting means to said fine comminuting means; [an] apertured [plate] *wall means* located between and separating said pre-comminuting means and fine comminuting means; and mixing and recirculating means cooperating with said pre-comminuting means for recirculating and mixing the material during treatment thereof in said pre-comminuting means, said [plate] *wall means* being spaced from said rotary blade of said pre-comminuting means and said recirculating and mixing means including a bowl in which said pre-comminuting means is located and a rotary vane located adjacent and turning with respect to said bowl and the inner surface thereof and having a free end portion located at that side of said blade which is directed toward said [plate] *wall means.*

3. In a device for comminuting meat or the like, in combination, a stationary container; pre-comminuting means located in said container; fine comminuting means located in said container subsequent to said pre-comminuting means in the direction of flow of material for receiving material from said pre-comminuting means and for fine comminuting the received material; an upper plate extending across the container between said pre-comminuting means and fine comminuting means for separating said pre-comminuting means and fine comminuting means from each other, said plate being formed with an opening passing therethrough; means cooperating with said pre-comminuting means for recirculating and mixing the material during treatment thereof in said pre-comminuting means; and a rotary closure plate located beneath and directly next to said upper plate and having in one angular position a portion aligned with the opening of said upper plate to close said opening thereof and in another angular position said closure plate having said portion thereof out of alignment with and uncovering said opening of said upper plate so that the latter may be optionally closed or opened to cut off or provide communication between said pre-comminuting and fine comminuting means.

4. In a device [for communicating meat and the like, in combination, a stationary container; pre-comminuting means located in said container; fine comminuting means located in said container subsequent to said pre-comminuting means in the direction of flow of material for receiving material from said pre-comminuting means and for fine comminuting the received material; an upper plate extending across the container between said pre-comminuting means and fine comminuting means for separating said pre-comminuting means and fine comminuting means from each other,] *as defined in claim 3, wherein* said upper plate being formed at predetermined portions thereof with apertures [:] *and wherein said* means cooperating with said pre-comminuting means [for circulating and mixing] *circulate and mix* the material during treatment thereof in said pre-comminuting means until the fineness of the material permits it to move through said apertures in said upper plate. [; and a rotary closure plate located beneath and directly next to said upper plate and having in one angular position portions which are aligned with the apertured portions of said upper plate to close said apertures thereof and in another angular position said closure plate having said portions thereof out of alignment with and uncovering said apertured portions of said upper plate so that the latter may be optionally closed or opened to cut off or provide communication between said pre-comminuting and fine comminuting means.]

5. In a device for comminuting meat or the like, in combination, a container having an endless side wall and a bottom wall; at least one rotary cutting blade having an outer tip, said rotary cutting blade being located in said container spaced from said bottom wall thereof with said outer tip of said blade spaced a substantial distance from said side wall, said blade comminuting during rotation thereof material in said container; an apertured plate carried by said container beneath said blade, whereby, due to the spacing of the tip of the blade from said endless side wall of the container, part of the material will be recirculated in said container during rotation of said blade before being discharged through the apertures in said plate; and rotary scraper means having an edge closely adjacent that surface of said plate which faces said blade for scraping said surface.

6. In a device [for comminuting meat or the like, in combination, a container having an endless side wall and a botton wall; at least one rotary cutting blade having an outer tip, said rotary cutting blade being located in said container spaced from said bottom wall thereof with said outer tips of said blade spaced a substantial distance from said side wall, said blade comminuting during rotation thereof material in said container; an apertured plate carried by said container beneath said blade, whereby, due to the spacing of the tip of the blade from said endless side of the container, part of the material will be recirculated in said container during rotation of said blade before being discharged through the apertures in said plate; and rotary scraper means spaced from said rotary cutting blade and having an edge closely adjacent that surface of said plate which faces said blade for scraping said surface,] *as defined in claim 5, wherein* said scraper means [comprising] *comprise* a scraper blade coaxial with and connected to said cutting blade for rotation with the latter.

7. In a device [for comminuting meat or the like, in combination, said blade being rotatable about a substantial vertical axis and being inclined to a plane normal to said axis so as to urge material acted upon by the blade downwardly; a container and a bottom wall; at least one rotary cutting blade having an outer tip, said rotary cutting blade being located in said container spaced from said bottom wall thereof with said outer tip of said blade spaced a substantial distance from said side wall, said blade comminuting during rotation thereof material in said container and said blade being rotatable about a substantially vertical axis and being inclined to a plane normal to said axis so as to urge material acted upon by the blade downwardly; an apertured plate carried by said container beneath said blade, whereby, due to the spacing of the tip of the blade from said endless side wall of the container, part of the material will be recirculated in said container during rotation of said blade before being discharged through the apertures in said plate; rotary scraper means spaced from said rotary cutting blade and having an edge closely adjacent that surface of said plate which faces said blade for scraping said surface, said scraper means comprising a scraper blade coaxial with and connected to said cutting blade for rotation with the latter; and] *as defined in claim 6, and including* spring means cooperating with said scraper blade and said plate for resiliently pressing the same against each other.

8. In a device for comminuting meat or the like, in combination, a stationary container having an inlet opening [in an upper part thereof]; partition means [extending across the container and] dividing the interior [thereof] *of the container* into [an upper] *a first* and a [lower] *second* chamber, said partition means being formed with an opening therethrough; discharge passage means communicating with said [lower] *second* chamber; pre-comminuting means in said [upper] *first* chamber constructed so as to comminute the meat or the like and simultaneously urge the comminuted material [downwardly] toward the opening in said partition means; fine comminuting means in said [lower] *second* chamber; and movable closure means mounted adjacent said partition means movable between an inoperative position leaving said opening in said partition means uncovered so that material pre-comminuted in said [upper] *first* chamber and urged by said pre-comminuting means toward said opening will pass through said uncovered opening directly into said [lower] *second* chamber to be further comminuted therein by said fine comminuting means, and an operative position covering said opening so as to prevent material from passing from said [upper] *first* into said [lower] *second* chamber so that material fed into said [upper] *first* chamber will be circulated therein for any desired length of time to the action of said pre-comminuting means.

9. *In a device as defined in claim 8, wherein said partition means extends across the container and divides the interior thereof into an upper and a lower chamber, wherein said discharge passage means communicates with said*

*lower chamber, wherein said pre-comminuting means are located in said upper chamber and constructed so as to comminute the meat or the like and simultaneously urge the comminuted material downwardly toward the opening in the partition means, wherein said fine comminuting means are located in said lower chamber so that when said movable closure means is in said inoperative position, pre-comminuted material in said upper chamber will pass through said uncovered opening directly into said lower chamber while when said closure means is in said operative position material will be prevented from passing from said upper to said lower chamber and be subjected in said upper chamber for any desired length of time to the action of said pre-comminuting means.*

*10. In a device for comminuting meat or the like, in combination, a first chamber; a second chamber; opening means providing communication between said chambers; pre-comminuting means in said first chamber constructed so as to commuinute the meat or the like and simultaneously urge the comminuted material toward said opening means; fine comminuting means in said second chamber; discharge passage means communicating with said second chamber; and movable closure means mounted in the region of said opening means movable between an inoperative position leaving said opening means open so that material pre-comminuted in said first chamber will pass through said opening means into said second chamber to be further comminuted by said fine comminuting means therein, and an operative position closing said opening means so that material fed into said first chamber will be subjected therein for any desired length of time to the action of said pre-comminuting means.*

*11. In a device as defined in claim 10 wherein said closure means extends substantially in one plane and is movable in said plane between said operative and said inoperative position.*

References Cited

The following references, cited by the Examiner, are of record in the patented file of this patent or the original patent.

UNITED STATES PATENTS

| | | | |
|---|---|---|---|
| 1,528,887 | 3/1925 | Offenhauser | 146—79X |
| 2,617,460 | 11/1952 | Levit | 146—67 |
| 2,918,956 | 12/1959 | Otto | 146—68 |
| 2,977,056 | 3/1961 | Gustke | 146—192X |
| 3,053,297 | 9/1962 | Brundler | 146—192 |
| 3,076,487 | 2/1963 | Illsley | 146—182 |

FOREIGN PATENTS

| | | |
|---|---|---|
| 194,229 | 12/1957 | Germany. |
| 343,252 | 1/1960 | Switzerland. |

OTHER REFERENCES

German printed application 1,006,197, April 1957, Schnell.

German printed application 1,051,053, February 1959, Heger.

W. GRAYDON ABERCROMBIE, Primary Examiner

U.S. Cl. X.R.

146—68